Patented May 13, 1930

1,758,616

UNITED STATES PATENT OFFICE

JOHN McGAVACK, OF JACKSON HEIGHTS, AND GEORGE B. BINMORE, OF LONG ISLAND CITY, NEW YORK, ASSIGNORS TO THE NAUGATUCK CHEMICAL COMPANY, OF NAUGATUCK, CONNECTICUT, A CORPORATION OF CONNECTICUT

METHOD FOR RECOVERING QUEBRACHITOL FROM RUBBER LATEX SERUM

No Drawing.    Application filed December 2, 1925. Serial No. 72,809.

The existence of appreciable percentages of interesting chemical compounds has long been recognized in the serum from rubber latex. Sufficient quantities of these have been isolated from the serum to permit of an academic study of the properties of the various compounds, but many of them, as for example quebrachitol, have never occupied a position other than that of rare chemicals. The principal reason for the rarity of these compounds has been the difficulty of separating them from the other compounds and materials with which they occur. Since quebrachitol is a soluble compound the methods preferably employed have been solution methods. Quebrachitol is highly soluble in water and for this reason is difficult to recover from a water solution. At the same time many of the other products associated with quebrachitol in latex serum are likewise soluble in water, so that it is not easy to recover the quebrachitol in any great degree of purity. When the serum from rubber latex is used as a raw material, further trouble is encountered in reducing this raw material to a dry stage prior to extraction of the quebrachitol and other materials. Vacuum concentration of the serum is not particularly satisfactory because it is too slow and because it yields a dense gummy mass, which is not easily penetrated by solvents.

The present invention is concerned with a simple method for recovering products such as quebrachitol from rubber latex serum with such a degree of efficiency that the product can be economically and easily recovered and placed on the market in quantities sufficient to permit the chemical arts to take advantage of the interesting properties of this substance. As illustrations of the potentialities of this compound, it is sufficient to state that quebrachitol is capable of transformation into quinones and quinone derivatives. It may also be used in the photographic developer industry. It has some sweetening power and it may be used as a substitute for saccharine. It may also be used as an important raw material in the preparation of therapeutic chemicals, particularly the phosphoric acid derivatives in the manufacture of phytin. It lends itself to the formation of organic esters in the same way that it is known to react with the mineral acids.

Accordingly the object of the invention is to provide a simple method for recovering quebrachitol from products containing it. Another object is to provide a method for recovering valuable constituents from rubber latex serum. A still further object is to provide a method for obtaining rubber latex serum in a condition which readily lends itself to extraction and other treatment. Other objects will be apparent from the detailed description and claims.

Briefly stated the method consists in reducing rubber latex serum to a dry powder, extracting the powder with a hot solvent, filtering the hot solution thus obtained, purifying and recovering the material from the solution. The invention also includes reducing latex serum to dryness by atomization into a heated chamber, and it also includes drying such serum on an inert pulverulent carrier.

Quebrachitol is chemically known as the monomethyl ether of hexahydroxycyclohexane and also as methly 1-inositol. The compound has been incorrectly called a carbohydrate, probably because certain of its properties bear a resemblance to those of the carbohydrates. Its melting point is approximately 190° C. and its boiling point (in vacuum) is approximately 210° C. Quebrachitol is laevo rotary, $(a)_d = -80.2°$. It is very soluble in water, somewhat soluble in hot ethyl alcohol but very little soluble in cold alcohol, and insoluble in ether. Its specific gravity at 0.° C. is 1.54. Other chemical properties and reactions are given in some detail by Tanret in Comptes Rendus 109, 1889, p. 908.

As rubber latex serum is a waste product the raw material cost is almost negligible, practically the only expense lies in the reduction of the serum to dryness. This can be done most easily by employing a spraying process. Thus a dry powder can be prepared in the Far East and shipped, or it may be treated there to recover the valuable constituents. Although any spraying method may be employed, it is preferred to use the rotary disc apparatus of Bradley & Coffin described in U. S. Patent 1,428,526. The rate of drying and the temperature employed will of course depend upon the type of drying apparatus employed. With the above spray apparatus, serum can be dried at the temperature which is employed for the evaporation of latex according to the process described in U. S. Patents to E. Hopkinson, 1,423,525–6. The serum employed may be either that resulting from natural coagulation of latex or from acetic or other acid coagulation. The product which is obtained by spraying is a powder which is easy to handle. This powder is extracted with hot alcohol for 15–20 minutes, after which time the hot alcohol in which is dissolved the quebrachitol is drained off. The extraction is repeated with fresh alcohol until no more quebrachitol remains in the dried serum. The alcoholic solution while still hot is treated with bone black or animal charcoal and the solution is concentrated to the desired point, and then filtered into crystallizing dishes where crystallization takes place in from 2–48 hrs. If a powdered material be mixed with the serum before the drying operation, it is possible to increase the extractibility of the dried serum by having it in a dispersed condition upon the particles of the inert powder. Such materials as clay, mineral flour, celite, fossil earth, and similar substances may be employed. Under some conditions it may be desirable to use ground bark waste, although portions of this will be extractible by the solvent employed later. If bark waste be used the process of the invention then includes the recovery of chemical products from this source as well as from the serum. It is preferable that the material employed to increase the dispersion of the dried serum shall have only a small retention value for water, that is it should be of a nature which dries readily. The lighter the specific gravity of the material, the easier it will be to secure an even mixture of serum and material and the spraying operation will also be facilitated. While generally speaking the spray process is particularly well suited to reducing the serum to a dried extractible condition, making use of powdered materials to increase the extractibility, it is of course understood that other methods of drying may be employed, provided the product is not formed in a gummy mass, but is either in powder form or otherwise easily extractible.

As a specific example of the proportions which may be employed, 100 kg. of latex serum will yield approximately 3 kg. of dried solid powder. For this amount of dried serum, namely 3 kgs., 50 kg. of 95% ethyl alcohol may be used. After extraction for 15–30 minutes, approximately 1 kilo of bone black is added to the solution which is boiled for a few minutes, filtered, concentrated, and then poured into crystallizing dishes. On account of the difference in solubility of quebrachitol in hot alcohol and in cold alcohol, it will be observed that as long as the solution is hot it will remain as a solution and no quebrachitol will separate out. This permits the necessary purification and clarification with bone black and filtration. When the filtered solution is cooled, however, a supersaturated solution is obtained, and the quebrachitol crystallizes out. The alcohol may of course be recovered and used again. With the above proportions, employing 3 kg. of dry serum, the yield of quebrachitol is 350–550 gr., that is 11.5%–18.5%. This amount is approximately the theoretical yield of quebrachitol. The percentage of this chemical which may be present in dried serum varies depending upon physiological conditions and is controlled to some extent by other factors. Finely divided silica gel or its equivalent may be employed instead of bone black and is to be regarded as the equivalent thereof as a clarifying agent. The alcohol may be distilled off after the first extraction and the residue consisting of impure quebrachitol may be taken up in water and then treated with bone black or silica gel, subsequently recrystallizing from a concentrated water solution.

Denatured alcohol may be employed instead of ethyl alcohol and acetone or glacial acetic acid may also be used in exactly the same way as the ethyl alcohol in the above example and are to be regarded as equivalents thereof. It appears that the solvent employed for extracting quebrachitol should be miscible with water in all proportions. Other alcohols such as propyl, allyl, butyl alcohols, etc. may be employed instead of ethyl alcohol. Better results are obtained with 95% ethyl alcohol than with the 98% grade.

Quebrachitol may be precipitated from an alcoholic solution by either acetone or ether, but the phenomenon is more nearly that of salting out than precipitation. Benzol gives about the same effect. In all instances, however, the quebrachitol separates in a finely divided condition which is not as easy to recover from the different solvents. Crystallization may be accelerated by artificial cooling, although care must be taken that the cooling is not carried on at so rapid a rate that the quebrachitol comes down in a more or less colloidal form. Continuous extraction can be employed as well as an intermittent extraction.

Prior to the dehydration of the serum, a portion of the precipitable nitrogenous material may be removed from the serum by precipitation or salting out. In this instance the precipitate or salted out material is filtered away from the serum, and only the filtrate is reduced to dryness. As the proteins are known to split into simpler products, precipitation or salting out may be performed upon fresh serum or upon serum in which scission of the proteins has been allowed to progress to a predetermined stage. The scission may be accelerated or retarded, depending upon the products and results which are sought. The greater the extent of scission, the greater will be the number of chemicals which may be recovered. The lesser the extent of scission, the greater will be the quantity of precipitable protein which can, if desired, be removed prior to drying the serum. The protein precipitates may be further treated to recover valuable products therefrom. The removal of the proteins, or a portion of them by precipitation, yields a liquor which is somewhat more readily extractible, and the extract, containing for example the quebrachitol, is easier to concentrate and the dissolved substances crystallize more easily.

This invention makes it possible to recover other valuable constituents from latex serum which have hitherto been thrown away, not because the existence of such by-products was unknown, but because a simple, efficient method for their recovery was lacking. When it is considered that for every 100 lbs. of rubber, approximately 300 lbs. of serum are thrown away, from which might be recovered 10 lbs. of solid material, it may readily be seen that vast quantities of valuable chemical material are being discarded. For every 100,000 lbs. of rubber produced by the coagulation method, there are approximately 1,500 lbs. of quebrachitol which might be recovered and 10,000 lbs. of other potential raw material which can yield chemicals having considerable value. The greater portion of the serum solids consists of nitrogenous matter usually termed the proteins, but this terminology may not be entirely correct. Some of the nitrogen is undoubtedly present as decomposition products of the proteins. Many of these products may be recovered by the present method by selecting a suitable extraction medium.

Having thus described our invention, what we claim and desire to protect by Letters Patent is:

1. A method for recovering quebrachitol from waste rubber latex serum which comprises converting the serum into a more readily extractible condition by removal of moisture, treating with a hot alcoholic solvent which is miscible with water in all proportions, and recovering quebrachitol from the solvent by changing the solution ratio of the quebrachitol to the solvent.

2. A method for recovering quebrachitol from rubber latex serum which comprises converting the serum into a more readily extractible state by removal of moisture, treating the extractible product with a hot alcoholic solvent which is miscible with water in all proportions to separate the material soluble therein from the remainder of the extractible product, withdrawing the solvent and material dissolved therein, and recovering quebrachitol from the solvent by changing the solution ratio of the quebrachitol to the solvent.

3. A method for obtaining quebrachitol from waste rubber latex serum which comprises drying the serum to an extractible condition, treating with a hot alcoholic liquid which is miscible with water in all proportions and which is a good solvent for quebrachitol when hot, but is a poor solvent when cool, maintaining a temperature somewhat below the boiling point of the solvent during extraction and subsequent separation of the quebrachitol from the serum residues, and recovering quebrachitol from the solvent by cooling.

4. A method for obtaining quebrachitol from waste rubber latex serum which comprises extracting dried serum with a heated alcoholic solvent for quebrachitol, separating the solution from the serum and treating with a clarifying agent while still heated, reducing the temperature of the solution and recovering quebrachitol therefrom.

5. A method for obtaining quebrachitol from rubber latex serum which comprises reducing the serum to a dried pulverulent condition, extracting the quebrachitol with a hot alcoholic solvent which is miscible with water in all proportions, separating the extract from the serum residue, clarifying the extract while still hot, cooling and recovering quebrachitol therefrom.

6. A method for obtaining quebrachitol from rubber latex serum which comprises reducing the serum to a dried pulverulent condition, extracting the quebrachitol with a hot alcoholic solvent which is miscible with water in all proportions, separating the extract from the serum residue, purifying the hot extract by clarifying and filtering, cooling and recovering quebrachitol from the cooled purified extract.

7. A method for obtaining quebrachitol from rubber latex serum which comprises reducing the serum to a dried pulverulent condition, extracting the quebrachitol with a hot alcoholic solvent which is miscible with water in all proportions, separating the extract from the serum residue, treating the hot extract with a carbonaceous purifying agent, filtering, cooling and recovering quebrachitol from the cooled purified extract.

8. A method for obtaining quebrachitol from rubber latex serum which comprises reducing the serum to a dried pulverulent condition, extracting the quebrachitol with a hot alcoholic solvent, separating the extract from the serum residue, treating the hot extract with a charcoal, filtering, cooling and recovering quebrachitol from the cooled purified extract.

9. A method for obtaining quebrachitol from rubber latex serum which comprises reducing the serum to a dried pulverulent condition, extracting the quebrachitol with a hot alcoholic solvent, separating the extract from the serum residue, treating the hot extract with a charcoal, filtering, concentrating, cooling and recovering quebrachitol from the cooled purified extract.

10. A method for obtaining quebrachitol from rubber latex serum which comprises spray drying the serum, extracting the dried material with a hot alcohol, separating the hot alcoholic solution from the serum residue, purifying and clarifying the solution with an animal charcoal, filtering out the charcoal and impurities, concentrating and cooling the hot alcohol solution and crystallizing quebrachitol therefrom.

11. A method for obtaining quebrachitol from rubber latex serum which comprises spray drying the serum, extracting the dried material with a hot ethyl alcohol, separating the hot alcoholic solution from the serum residue, purifying and clarifying the solution with a bone black, filtering out the charcoal and impurities, concentrating and cooling the hot alcohol solution and crystallizing quebrachitol therefrom.

12. In a process for extracting material from dried latex serum by means of a heated alcoholic solvent which is miscible with water in all proportions, the step of drying latex serum upon a pulverulent substance to increase the extractibility of the dried serum.

13. In a process for extracting material from dried latex serum by means of a heated alcoholic solvent which is miscible with water in all proportions, the step of drying latex serum upon a pulverulent material inert towards said solvent.

Signed at New York, New York, this 18th day of November, 1925.

JOHN McGAVACK.

Signed at New York, New York, this 18th day of November, 1925.

GEORGE B. BINMORE.